March 26, 1968 — J. A. COURSE — 3,374,572
TOY EYE EXAMINATION KIT
Filed Oct. 22, 1965 — 2 Sheets-Sheet 1
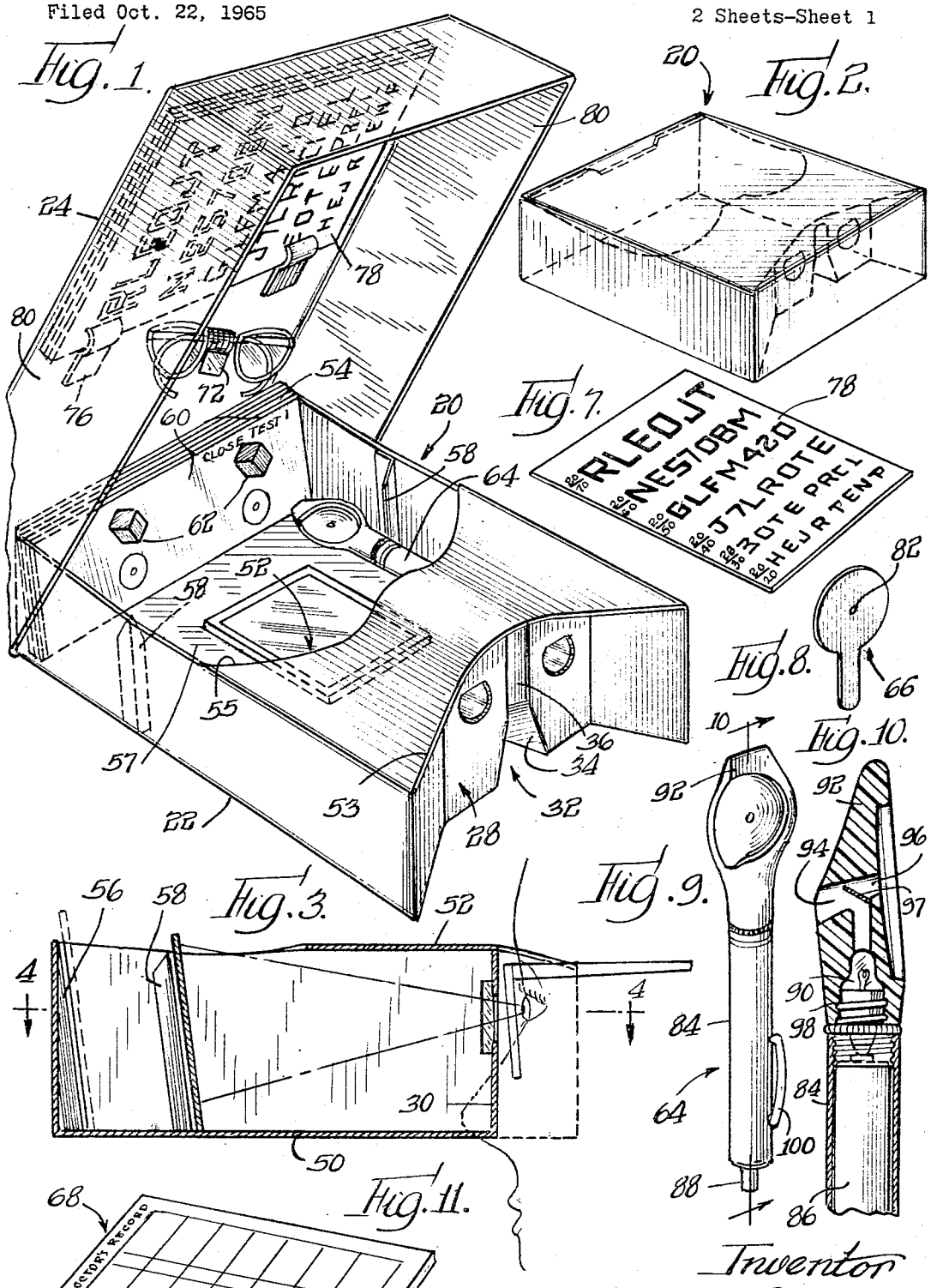
Inventor
John A. Course
By: Olson, Trexler, Wolters
& Bushnell attys.

March 26, 1968 J. A. COURSE 3,374,572
TOY EYE EXAMINATION KIT
Filed Oct. 22, 1965 2 Sheets-Sheet 2
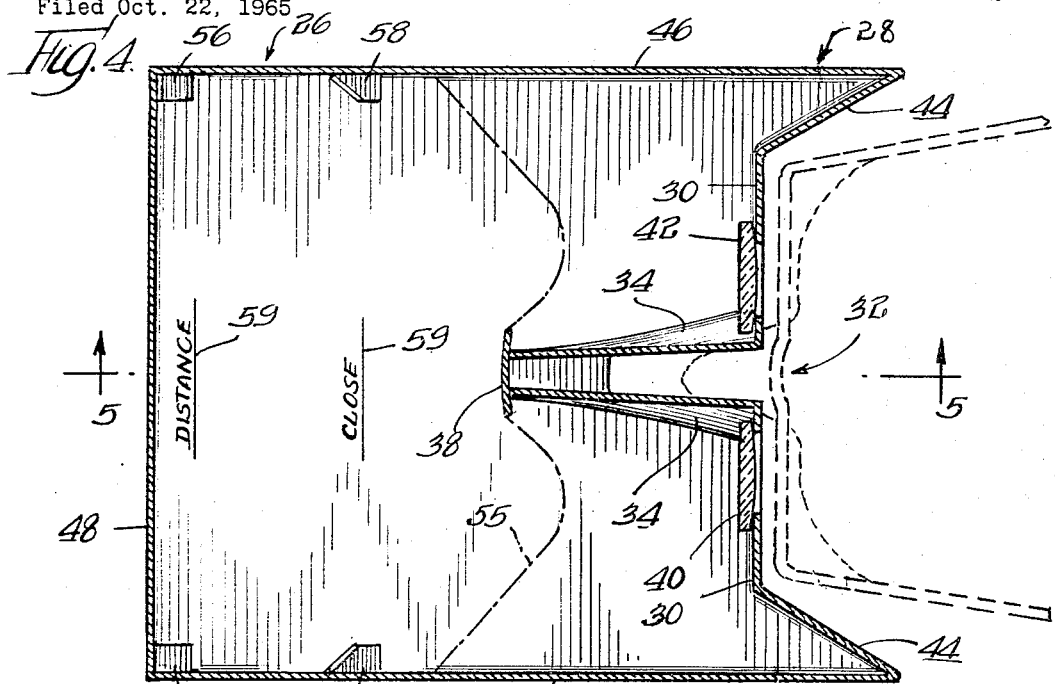
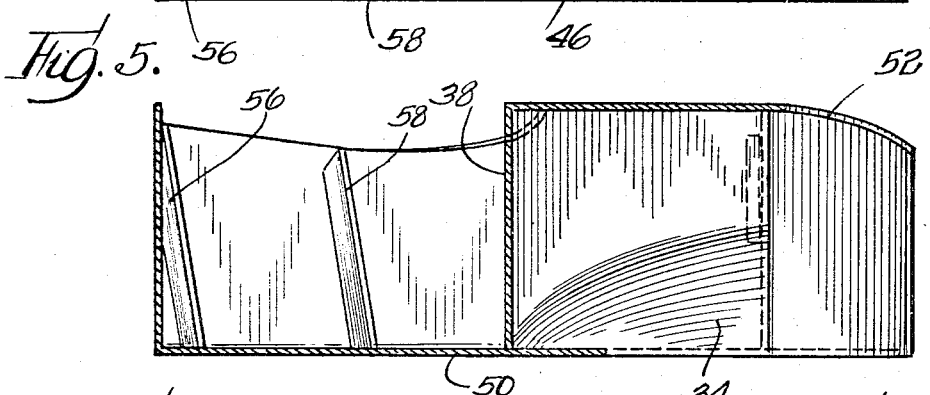
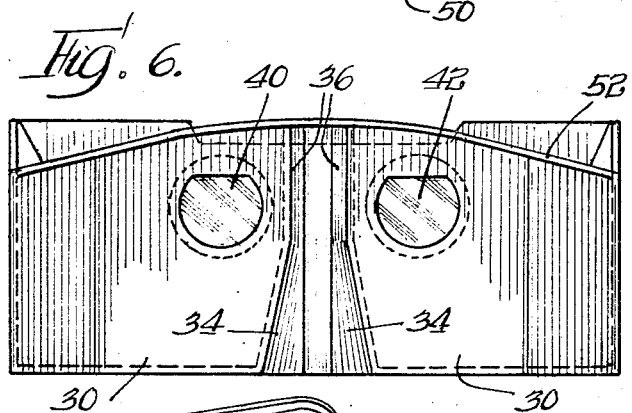
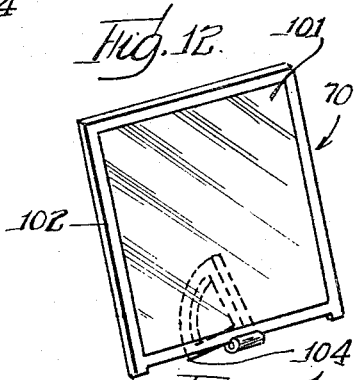
Inventor
John A. Course
By: Olson, Trexler, Wolters
& Bushnell attys.

United States Patent Office 3,374,572
Patented Mar. 26, 1968

3,374,572
TOY EYE EXAMINATION KIT
John A. Course, 18025 Dixie Highway,
Homewood, Ill. 60430
Filed Oct. 22, 1965, Ser. No. 501,914
8 Claims. (Cl. 46—11)

ABSTRACT OF THE DISCLOSURE

A toy eye examination kit is disclosed comprising a viewer in the form of a box which is adapted to retain card means and instruments used in the examination.

This invention relates to a child's toy, and more particularly to a toy eye examination or optometrist kit.

Toy doctor's kits are often used by children to play with. Such a kit is generally limited to a few candy pills, a tongue depressor, and a model of a stethoscope. Generally speaking, such kits, and the devices contained therein, cannot be used by the child in the same manner as they are used by a doctor. Therefore, the child usually loses interest in the kit and discards it.

The toy eye examination kit, which is the subject matter of this application, can be utilized to test eyes in a manner similar to that actually practiced by a doctor. The tests are educational, since the child, in playing with the toy, will soon have an appreciation of some of the basic principles of optics and vision. While the test results, will not in any way be a substitute for an examination by a doctor, they do indicate when a "patient" should seek professional care.

A general object of the present invention is to provide a toy eye examination kit.

Another object of this invention is to provide a toy eye examination or optometrist kit wherein the various parts of the kit are stored in a container which is utilized to "test" the eyes of the "patient" when the toy is utilized.

Another object of this invention is to provide a toy eye examination kit which is suitable for giving "tests" of both distant and close visual skills.

For a fuller understanding of the nature and objects of the invention, reference should be had to the following detailed description, taken in connection with the accompanying drawings, wherein:

FIGURE 1 is a perspective view of an eye examination kit including features of the present invention with the cover open;

FIG. 2 is a perspective view of the kit with the cover closed;

FIG. 3 is a fragmentary sectional view of the kit in use;

FIGS. 4, 5 and 6 are detail views of the base portion of the kit;

FIG. 7 is a perspective view of the chart for testing visual characteristics at a distance;

FIG. 8 is a perspective view of the light shield;

FIG. 9 is a perspective view of the opthalmoscope;

FIG. 10 is a fragmentary sectional view of the opthalmoscope;

FIG. 11 is a perspective view of the record pad;

FIG. 12 is a perspective view of the mirror; and

FIG. 13 is a perspective view of the spectacles.

Referring now to the drawings, there is shown in FIG. 1 one preferred embodiment of the present invention. The optometrist or eye examination kit 20 includes a base portion 22 and a cover 24. The base portion 22 is composed of a card positioning portion 26 and a viewing portion 28 (see FIGS. 1 and 4). The viewing portion 28 has two vertical walls 30. The vertical walls 30 have a nose-encompassing portion 32 therebetween. This nose-encompassing portion 32 consists of a pair of curved walls 34 which are connected to the vertically extending walls 36 (see FIGS. 4–6). The nose-receiving portion terminates at the substantially vertical wall 38. The vertical walls 30 have lenses 40 and 42 located therein. Laterally projecting walls 44 are connected to the vertical wall 30 and flair outwardly to junctions with ends of sidewalls 46 of the base member 22. The two sidewalls 46 are connected to an end wall 48 and are spaced from and generally parallel to the walls 30. All of the upstanding walls of the base member are joined to and supported by a bottom sheet 50. The nose-receiving portion is covered by the covering member 52, as shown in FIGS. 1, 5 and 6. The covering member 52 has its foremost edge 53 shaped to fit the forehead of the viewer, as is best shown in FIGS. 1 and 3.

The covering member 52 and laterally projecting walls 44 enclose the forehead of the viewer (see FIGS. 3 and 4). Thus, any glare from the viewer's surroundings is effectively blocked from interfering with the viewer's vision while the tests are given. Also, the viewer, whose eyes are being tested, can not be distracted by his surroundings. The cover 52 in addition to blocking light, also has an edge 55 spaced from the wall 48 so as to define an access opening 57 into the interior of the base 22. The cover 52 provides two storage compartments on either side of the nose encompassing portion 32 between the walls 30, 34 and 46. The access opening 57 also provides direct access to the card positioning and storage portion 26 of the base member.

When the kit is to be used by a viewer, the nose of the viewer is placed in the nose-receiving portion 32. The laterally projecting sidewalls 44 will encompass the side of the forehead of the viewer, while the cover member 52 will rest against the front of the forehead of the viewer (see FIGS. 3 and 4). Thus, the viewing portion of the base member 22 is designed to support the lenses 40 and 42 and to provide a relatively comfortable positioning means for the viewer's head.

Cards 54 having various suitable indicia 62 thereon are provided for conducting various tests, such as, for example, tests for vertical imbalance, astigmatism, depth perception, and fusion. The card-positioning portion of the base member 22 positions cards 54 so that they may be viewed through the lenses 40 and 42. The card positioning means consists of first ribs 56 which extend from sides 46 of the base 22 adjacent to the end wall 48. The first ribs 56 are used to position cards 54 for tests of distant vision characteristics. The second ribs 58 are parallel to the first ribs and are used to position cards for tests of close vision chracteristics. As is seen in FIG. 4, indicia 59 has been provided on the base to indicate which set of ribs is associated with which type of test. The cards 54 are also provided with indicia 60 to indicate which type of test, i.e. close or distant, they are associated with.

The cards 54 have indicia 62 thereon which, when viewed through the lenses 40 and 42, provide for a test of the visual characteristics of the viewer. Such testing indicia are well known to those skilled in the art of visual testing. Thus, it is seen that the cards 54 have indicia 60 which indicate which of the positioning means 56 the card is to be associated with. The card 54 also has indicia 62 which cooperate with the lenses 40 and 42 of the base 22 to test the eyes of a viewer looking through the lenses.

The base member 22 acts as a storage device for the cards 54 when the optometrist kit is not in use. The base member also serves to store other instruments or accessories that are included in the kit in order to provide for a more complete examination. In the embodiment shown an opthalmoscope 64, a light shield 66, record forms 68, and mirror 70 are included. The covering portion 52 for the viewing portion of the base member extends beyond the viewing portion itself, as is shown in FIG. 3. The cover member 52 will, therefore, serve as a retaining means for the various accessories which are stored in the kit (see FIG. 1). When the cover member 24 is placed over the base member 22, as shown in FIG. 2, the base member 22 is covered in a manner suitable for storage of the base and the accessories contained therein.

The cover 24, in addition to covering the base member 22, has spectacle retaining clips 72 secured thereto for releasably retaining spectacles 74. The cover 24 also has retaining clips 76 for the distant vision chart 78. These clips 76 position the distant vision chart in the cover 24 and retain the chart against the upper surface of the cover. When the distant vision chart 78 is so retained in the cover, the cover is used as a stand to position the distant vision chart for viewing while testing the eyes of the viewer. When the cover 24 is utilized to position the chart 78, the cover is supported on one of its sides 80. Thus, the cover 24 provides a means for retaining the spectacles 74 for storage, and for storing and displaying the chart 78. In addition to the other functions, the cover 24, as previously explained, also covers the base member 22 when the kit is not in use.

The kit 22 is provided with the instruments or accessories shown in FIGS. 7 to 13. The distant vision chart 78 is shown in FIG. 7, and is similar to the well-known eye testing chart commonly used for eye examinations. The light shield of FIG. 8 has a pinhole 82. The light shield 66 focuses the vision of the user through the pinhole 82, and appears to give a magnification of the article viewed through the pinhole 82. The opthalmoscope 64 is shown in FIG. 9. The manner in which the opthalmoscope of FIG. 9 operates and is used will be explained in greater detail later. In FIG. 11, the recording pad 68 is shown. This recording pad is utilized by the child to record the results of the tests which the child administers to his "patient." The mirror of FIG. 12 is used by the "patient" to view the appearance of the spectacles 74 when prescribed by the child "optometrist."

The toy opthalmoscope of FIG. 9 is used as an exploratory lighting instrument to examine the eyes of the "patient." The opthalmoscope has a cylindrical casing 84 which encloses the batteries 86. The switch 88 is utilized to connect the batteries 86 to the light bulb 90 which is at the upper end of the casing 84. The light bulb 90 is encased by the viewing shield 92. The viewing shield 92 has an aperture 94 in the front surface of the shield. The back surface of the shield has a smaller aperture 96 which communicates directly with the upper portion of the front aperture 94. The light from the bulb 90 is reflected out of the front aperture 94 by the mirror 97. The mirror 97 is positioned with its longitudinal axis at an acute angle to the longitudinal axis of the casing 84 (see FIG. 10).

The child "doctor" utilizes the opthalmoscope by looking through the aperture 96 and pressing the switch 88 to light the bulb 90. The light from the bulb 90 when reflected by the mirror 97 illuminates the object which is being examined by the "doctor" through the aperture 96. The shield 92 of the opthalmoscope is molded of a hard plastic material and has a screw connection 98 with the casing 84. If desired, the casing 84 may be provided with a pocket clip 100.

The mirror 70 shown in FIG. 12 which is also provided as an accessory to the kit 20 has a frame 102 for the mirror glass 101. The base of the frame 102 is connected to a stand 104 which is pivoted at the base of the frame 102 by the hinge 106. The back of the frame 102 is also provided with a mirror glass similar to 101. Thus, by pivoting the stand 104, either the front mirror or the back mirror may be utilized to reflect the viewer's face. When the child "doctor" prescribes toy spectacles 74 for his "patient" the patient can use the mirror 70 to check the appearance and the fit of the spectacles 74. It should be noted that the lenses 106 of the spectacles 74 are of plain glass or plastic.

From the foregoing detailed description of the toy eye examination kit, it is apparent that several "tests" of the child patient's eyes may be performed by the child "doctor." The first series of tests are performed by positioning the cards 54 in one of two positions, depending upon whether close vision or far vision is to be tested. The patient looks through the lenses 40 and 42 of the base 22 and views the cards as positioned in the positioning portion 26 of the base 22. The test indicia 62 will appear substantially different to the viewer when viewed through the lenses 40, 42. The distant visual skills of the "patient" may be tested by utilizing the chart 78. The chart 78 is displayed in the cover member 24 where it is held by the clips 76. The cover 24 is positioned on its side 80 on a support which is located some distance from the child "patient."

In addition to performing these tests, the child "doctor" may examine the eyes of his patient with the opthalmoscope 64 and light shield 60. A record of the test results is kept by the child "doctor" on the record pad 68. The spectacles 74 are included in the kit so that the child "doctor," if he feels the situation warrants it, will prescribe spectacles for his "patient." A test booklet, not shown, is included in the kit 20. This test booklet describes how the various tests are performed with the cards 54 and the chart 78.

The test booklet also interprets the results of the "test" for the child "doctor." The test interpretation contained in this booklet explains the basic optic phenomena involved in testing the visual characteristics of a "patient's" eyes. Thus, through the use of the kit 20 and the explanation contained in the test booklet, the child "doctor" obtains an impression of how eyes are tested and of the principles of optics which are utilized in performing these tests.

While a particular embodiment of the invention has been shown, it should be understood, of course, that the invention is not limited thereto, since many modifications may be made; and it is, therefore, contemplated to cover by the appended claims any such modifications as fall within the true spirit and scope of the invention.

What is claimed is:

1. An eye examination kit comprising base means, card means having indicia thereon to test the vision of a viewer, a card positioning portion in said base means, positioning means in said card positioning portion for holding the card means in a predetermined position relative to said base means, a viewing portion in said base means, a plurality of lenses located in said viewing portion through which a card, in said card positioning portion, is viewed, storage means in said base means including a bottom to store said card means when said epe examination kit is not in use, and cover means removably positioned over said base means, spectacle retaining means operatively connected to said cover means and chart retaining and displaying means operatively connected to said cover means.

2. A kit as set forth in claim 1 which includes a plurality of said card positioning means in said positioning portion, position indicia adjacent each of said positioning means, indicia on said cards to indicate which of said positioning means the card cooperates with, and said cards have indicia to test the vision of the viewer.

3. A kit as set forth in claim 2 which includes a plurality of said positioning means in said positioning portion, each of said plurality of card positioning means including rib means extending from opposite sides of said base means and the longitudinal axis of said rib means being positioned at an acute angle to the longitudinal axis of said base means.

4. A kit as set forth in claim 1 wherein said viewing portion further includes vertically extending side means for mounting said lenses, a nose-receiving recess in said side means, a pair of lateral extensions to close the side of the viewer's forehead, and a cover portion over said side means, nose-receiving portion and lateral extensions, the forward edge of said cover portion being formed to receive the forehead of the viewer.

5. A kit as set forth in claim 1 wherein said base portion includes opposite sides partially defining storage portion, said cover means extending over said lenses.

6. A kit as set forth in claim 1 wherein said card positioning means includes rib means extending from opposite sides of said base means, the longitudinal axis of said rib means being located at an acute angle to the longitudinal axis of said base means, said viewing portion further including vertically extending side means for mounting said lenses, a nose-receiving recess in said side means, a pair of lateral extensions for enclosing the sides of the viewer's forehead connected to said side means, and a cover portion over said side means, nose-receiving portion, and lateral extensions, the forward edge of said cover portion being formed to receive the forehead of the viewer.

7. A toy eye examination kit comprising a base means, lens means operatively connected to said base means, a plurality of card positioning means operatively connected to said base to position cards for viewing through said lens means, card means having first indicia thereon to indicate which of said positioning means said card means is associated with, second indicia on said card means to test the vision of the viewer, chart means, indicia means on said chart means to test the visual acuity of the viewer at a distance, an exploratory light including a light shield and a mirror, a pair of spectacles, a record form, a cover means, spectacle retaining means operatively connected to said cover means for retaining said spectacles, chart retaining and display means operatively connected to said cover for retaining and displaying said chart, and storage means in said base means for storing said exploratory light, forms and booklets.

8. A kit as set forth in claim 7, wherein said exploratory light includes battery means, a light source, a viewing shield encompassing said light source, said mirror being in said viewing shield to reflect the light from said light source.

References Cited
UNITED STATES PATENTS 2,930,286   3/1960   Rabben     351—3 X
2,933,015   4/1960   Somach     350—140

LOUIS G. MANCENE, *Primary Examiner.*

F. BARRY SHAY, *Examiner.*

R. F. CUTTING, *Assistant Examiner.*